(12) United States Patent
Breau et al.

(10) Patent No.: US 7,817,576 B1
(45) Date of Patent: Oct. 19, 2010

(54) TRANSITIONING BETWEEN MULTIPLE DATA STREAMS OF A MEDIA CHANNEL BASED ON CLIENT CONDITIONS

(75) Inventors: Jeremy R. Breau, Kansas City, MO (US); Frederick C. Rogers, Olathe, KS (US); Lyle T. Bertz, Lee's Summit, MO (US); William Routt, Leawood, KS (US); Amirali Emami, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 384 days.

(21) Appl. No.: 11/939,290

(22) Filed: Nov. 13, 2007

(51) Int. Cl.
*H04L 12/26* (2006.01)
(52) U.S. Cl. .................... 370/252; 370/468
(58) Field of Classification Search ......... 370/229–235, 370/252–253, 464–465, 468; 709/230–235
See application file for complete search history.

(56) References Cited

U.S. PATENT DOCUMENTS

| 7,636,934 | B2 * | 12/2009 | Baldwin et al. | 725/101 |
| 2004/0168185 | A1 * | 8/2004 | Dawson et al. | 725/38 |
| 2005/0080904 | A1 * | 4/2005 | Green | 709/227 |
| 2007/0053293 | A1 * | 3/2007 | McDonald et al. | 370/235 |

* cited by examiner

*Primary Examiner*—Ricky Ngo
*Assistant Examiner*—Pao Sinkantarakorn

(57) ABSTRACT

A method, system, and computer-readable media are provided for transitioning between multiple data streams of a media channel. Techniques disclosed include transmitting multimedia content of a media channel across a plurality of data streams, wherein the plurality of data streams include a random access point data stream, a main data stream, and a low resolution data stream. The techniques disclosed further include detecting a client-condition of a client device and transmitting data packets from a data stream to a client based on the detected client-condition.

21 Claims, 6 Drawing Sheets

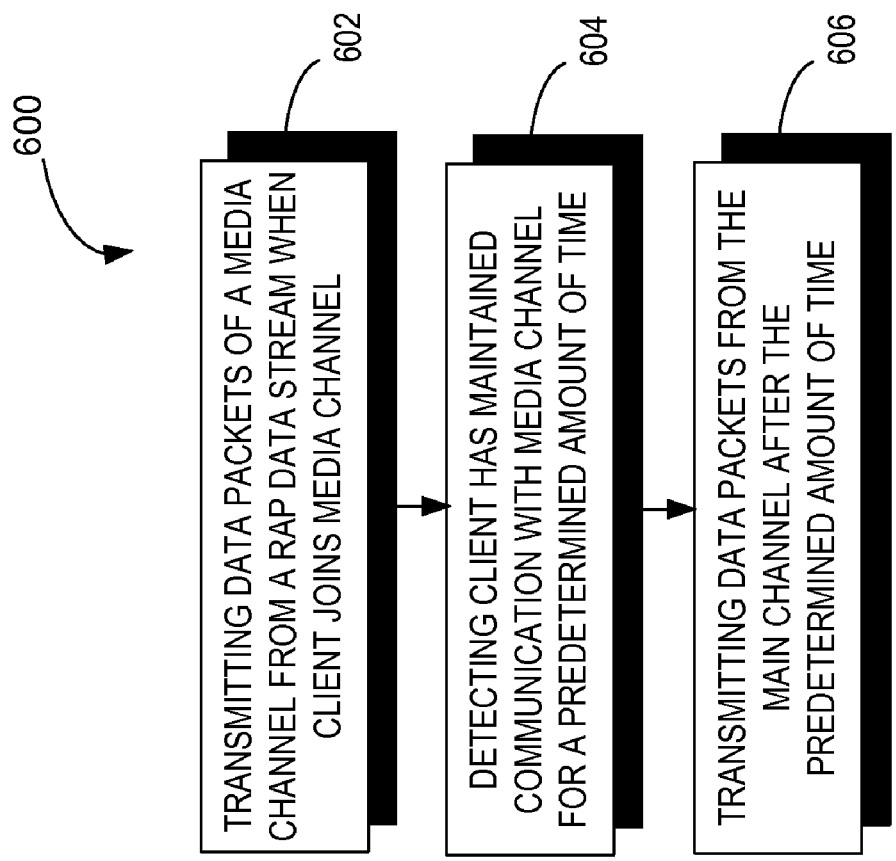

US 7,817,576 B1

TRANSITIONING BETWEEN MULTIPLE DATA STREAMS OF A MEDIA CHANNEL BASED ON CLIENT CONDITIONS

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method for, among other things, transitioning between multiple data streams of a media channel.

In a first aspect, a set of computer-readable media provide a method that includes transmitting multimedia content of a media channel across a plurality of data streams, the plurality of data streams including a random access point data stream, a main data stream, and a low resolution data stream. The method further includes detecting a client-condition of a client device and transmitting data packets from a data stream to a client based on the detected client-condition.

In a second aspect, a set of computer-readable media provide another method that includes transmitting a data packet of a media channel to a client from a random access point data stream when the client first joins the media channel. The method further includes detecting the client has maintained communication with the media channel for a predetermined length of time. Additionally, the method includes transmitting a data packet of the media channel to the client from a main data stream after the client has maintained communication with the media channel for the predetermined length of time.

In a third aspect, a system is provided that includes a client-condition detection component for detecting a condition of a client, and a data stream transmitter for transmitting a data packet from a data stream of the media channel based on the detected client condition.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 6 is a flow diagram of another exemplary method for transitioning between multiple data streams of a media channel according to an embodiment of the invention.

DETAILED DESCRIPTION

Various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media which includes computer-storage media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
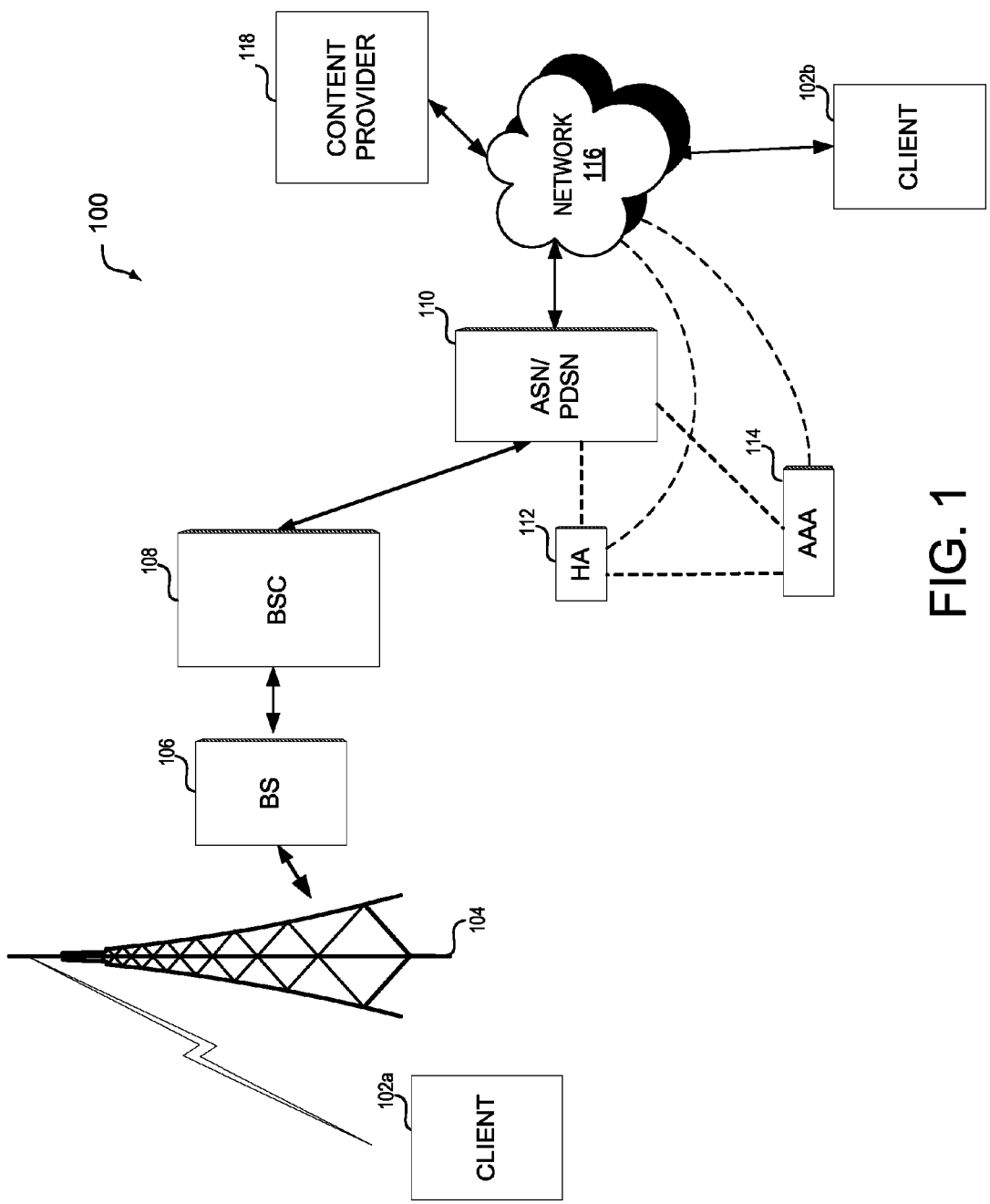
FIG. 1 is a block diagram of an exemplary system for implementing an embodiment of the invention.

FIG. 1 is a block diagram of an exemplary system 100 for implementing an embodiment of the invention. The system 100 includes client 102 (102a and 102b), content provider 118, network 116, and wireless communication service provider components 104, 106, 108, 110, 112, and 114. Client 102 and content provider 118 each include a communication interface. The communication interface may be an interface that can allow the client 102b and content provider 118 to be directly connected to each other or allows the client 102b and content provider 118 to be connected to each other over network 116. Network 116 can include, for example, a local area network (LAN), a wide area network (WAN), or the Internet. In an embodiment, the client 102a and content provider 118 can be connected to each other through a wireless communication interface through network 116 using wireless communication service provider components 104, 106, 108, 110, 112, and 114.

Content provider 118 may be or can include a server such as a workstation running the Microsoft Windows®, MacOS™, Unix™, Linux™, Xenix™, IBM AIX™, Hewlett-Packard UX™, Novell Netware™, Sun Microsystems Solaris™, OS/2™, BeOS™, Mach™, Apache™, OpenStep™ or other operating system or platform. Content provider 118 is configured to provide a plurality of different types of multimedia content, including video, audio, and text data, to one or more client devices 102. In an embodiment, content provider 118 can provide real-time streaming delivery of multimedia content over Internet Protocol (IP) via network 106. In an embodiment, content provider 118 may be a television program provider that provides television programming to client 102. In another embodiment, content provider 118 may be a Voice-over IP (VoIP) provider for facilitating phone calls between two or more clients 102.

Client 102 may be or can include a desktop computer, a laptop computer or other mobile computing device, an audio/video set-top box, a network-enabled cellular telephone (with or without media capturing/playback capabilities), wireless email client, or other client, machine or device to perform various tasks including Web browsing, search, electronic mail (email) and other tasks, applications and functions. Client 102 may additionally be any portable media device such as digital still camera devices, digital video cameras (with or without still image capture functionality), media players such as personal music players and personal video players, and any other portable media device.

The Base Station (BS) 106 contains equipment for transmitting and receiving of radio signals from a communication tower 104. BS 106 also has other equipment for encrypting and decrypting communication with the Base Station Controller (BSC) 108. The BSC 108 may be configured to receive radio signals that are converted into Time Division Multiplexing (TDM) from a BS 106. In an embodiment, the BSC 108 can have a plurality of BSs under its control. The BSC 108 may handle the allocation of radio channels, may receive measurements from mobile devices, and can control handovers from one BS to another BS. Another function of the BSC 108 is to act as a concentrator of communication sessions where many different low capacity connections to the BSs (with relatively low utilization) become reduced to a smaller number of connections toward a Mobile Switching Center (MSC) (with a high level of utilization). The BSC may also be configured to send voice information from the TDM signal to the MSC and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102 for Global System for Mobile Communication (GSM) and Code Division Multiple Access (CDMA) or over Generic Routing Encapsulation (GRE) for the Worldwide Interoperability for Microwave Access (WiMAX) networks. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information.

Figure 2:
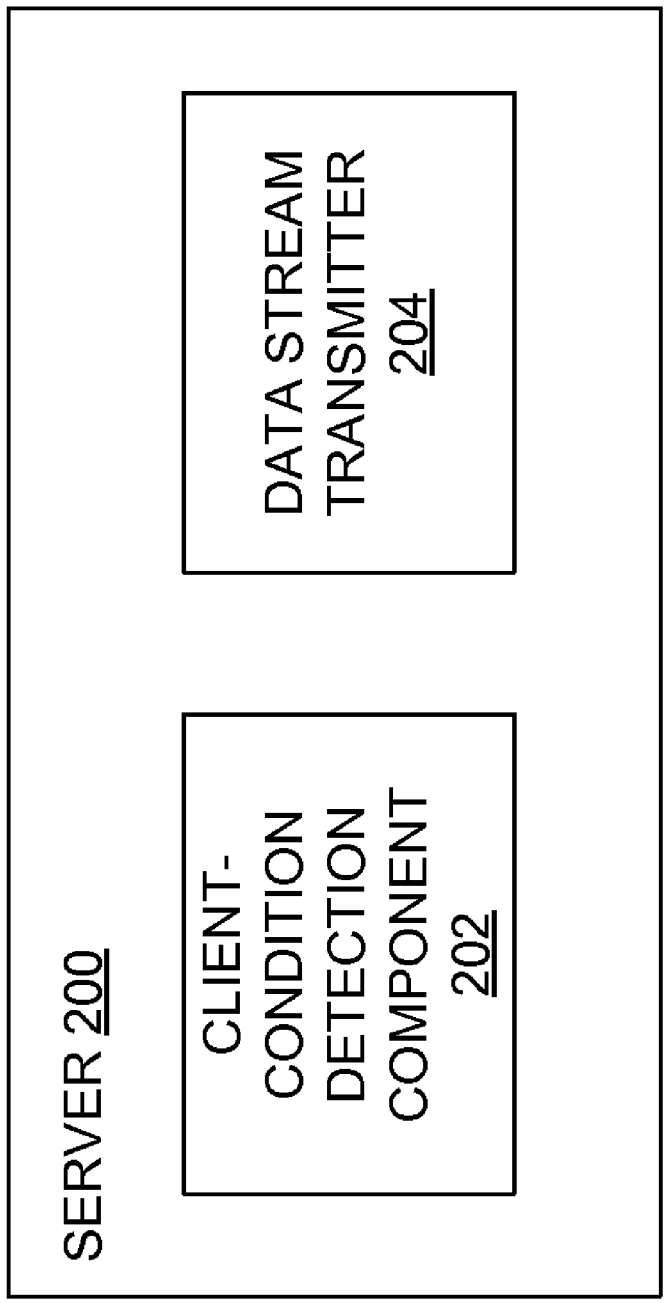
FIG. 2 is a block diagram of a server for switching between multiple data streams of the same media channel sent to a client according to an embodiment of the invention.

FIG. 2 is a block diagram of a server 200 for switching between multiple data streams of the same media channel sent to a client according to an embodiment of the invention. In an embodiment, server 200 may be a content provider such as content provider 118. In another embodiment, server 200 may be a component of a wireless communication service provider that communicates with one or more content providers 118. In yet another embodiment, server 200 may be a third party server that communicates with one or more content providers 118 and one or more components of a wireless communication service provider.

In an embodiment, the client 102 and server 200 exchange multimedia data using the Real-time Transport Protocol (RTP). RTP defines a standardized packet format for delivering multimedia data over the Internet. The RTP, the Real-time Transport Control Protocol (RTCP), and the Real Time Streaming Protocol (RTSP) are commonly used together. RTCP provides out-of-band control information for an RTP flow. RTCP partners with RTP in the delivery and packaging of multimedia data. RTCP is used periodically to transmit control packets to participants in a streaming multimedia session. A primary function of RTCP is to provide feedback on the quality of service being provided by RTP. RTSP is a protocol for use in streaming media systems which allows a client to remotely control a streaming media server by issuing commands such as "play" and "pause." RTSP can also be used to allow time-based access to files on a server.

Figure 3:
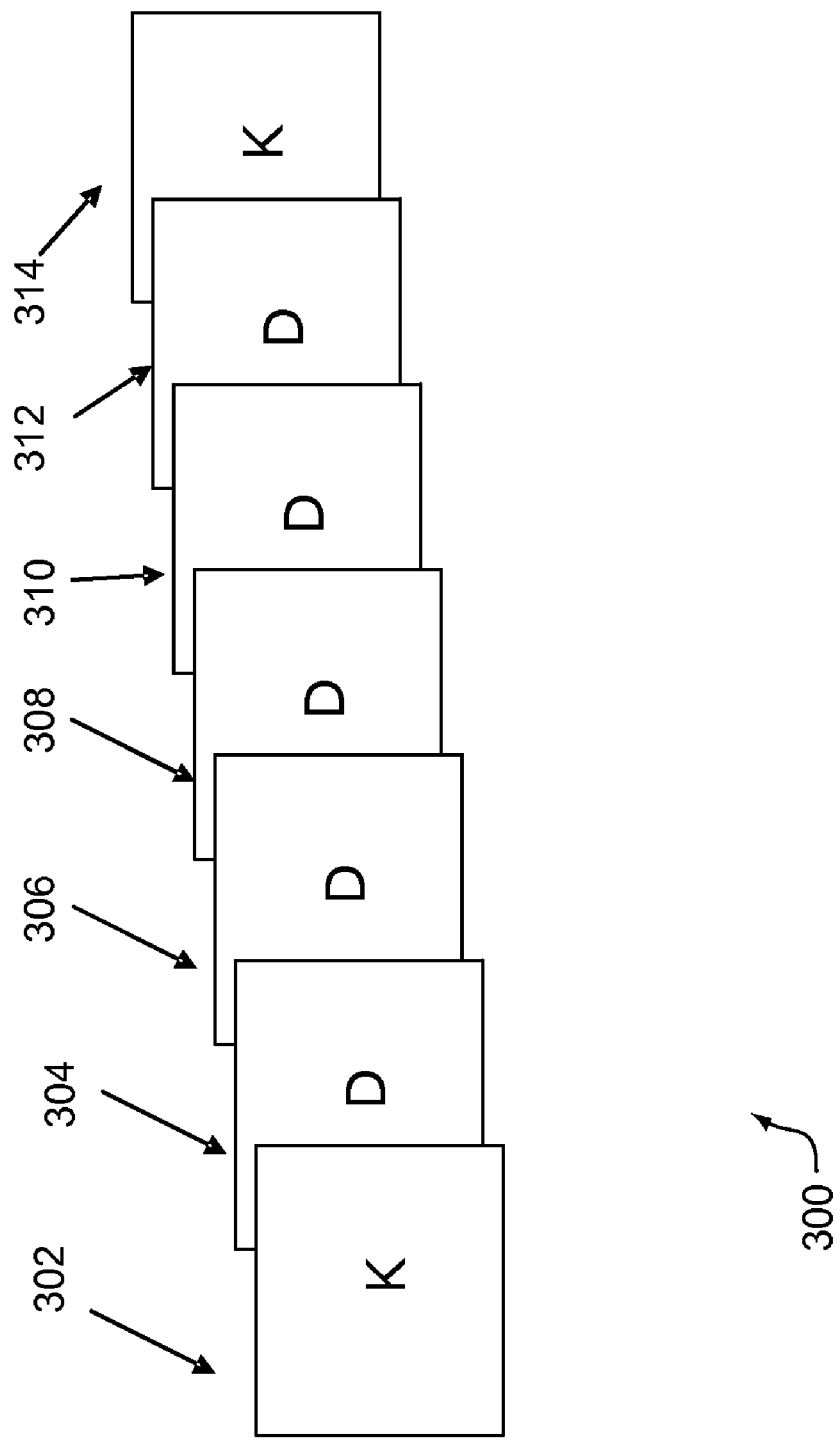
FIG. 3 is a block diagram of an exemplary data stream of multimedia content that can be sent from a server to a client device according to an embodiment of the invention.

FIG. 3 is a block diagram of an exemplary data stream of multimedia content 300 that can be sent from a server 200 to a client device 102 according to an embodiment of the invention. The stream 300 may be, for example, a stream of video content. In FIG. 3, the first data packet 302 includes a key frame. Generally, the initial packet of a video stream is referred to as a key frame which may also be known as a random access point (RAP). A key frame represents a full and complete image that is displayed on a display screen of a client device 102. Typically, an algorithm is used to calculate the differences between the key frame 302 and the next frame to be displayed in the video content. Instead of sending the full complete frame of the next frame, only the differences between the key frame 302 and the next frame are sent as a dependent frame 304. Dependent frames 306, 308, 310, and 312 are subsequently sent and contain a frame of video content that represents the differences between the frame before it and the next frame that is to be displayed, also known as a predictive frame or predicted frame (P-frame). Also, dependent frames 306, 308, 310, and 312 are subsequently sent and contain a frame of video content that represents the differences between the frame before it and the frame after it. This frame is known as a bi-directional frame or bi-directional predictive frame (B-frame).

Dependent frames are generally smaller in size than key frames. The smaller size is one reason why dependent frames are sent more often than key frames. The smaller size saves bandwidth for a data stream and reduces processing times. For example, it may take six to thirty-six dependent frames to complete a full image for standard encoders. Moreover, a key frame may be sent only once or twice within an entire video stream. For example, referring to FIG. 3, if the video stream 300 (not including key frame 314) is of a television show, a first key frame 302 may be sent to start the playback of the beginning of the show. Five to eight minutes later, a second key frame 314 may be sent to start the playback of a commercial, for example, followed by a series of dependent frames of the video content for the commercial. A third key frame (not shown) may be sent after the end of the commercial to begin the playback of the rest of the television show, for example, followed by a series of dependent frames comprising the rest of the segment of the show. Many broadcast standards require at least one key frame per second but this is not always followed by those who generate the source stream.

The distribution of key frames and dependent frames is an important aspect when it comes to channel changing in streaming multimedia data to client devices 102. A channel change occurs when a user takes action to switch from one item of multimedia content to another. Some examples of channel changes are: switching from one television channel to another, switching from one radio channel to another, and switching from one caller to another on a VoIP call when a call waiting service is in use.

Referring back to FIG. 2, server 200 may include client-condition detection component (CCDC) 202 and data stream transmitter 204. CCDC 202 is a computer hardware or software component configured to detect different conditions of the client 102. Generally, a condition of the client relates to an application usage of the client 102 or a condition that affects the client's ability to present a sufficient quality media frame to a user. For example, client condition may include, but is not limited to, a client running a picture-in-picture application, a client executing a channel change and thus joining a new channel, a client maintaining usage of a channel for a predetermined length of time, and a client experiencing a low data link within a channel wherein the channel's effective bandwidth is lower that what is required by the channel in order to provide a normal or acceptable presentation experience to a user.

Figure 4:
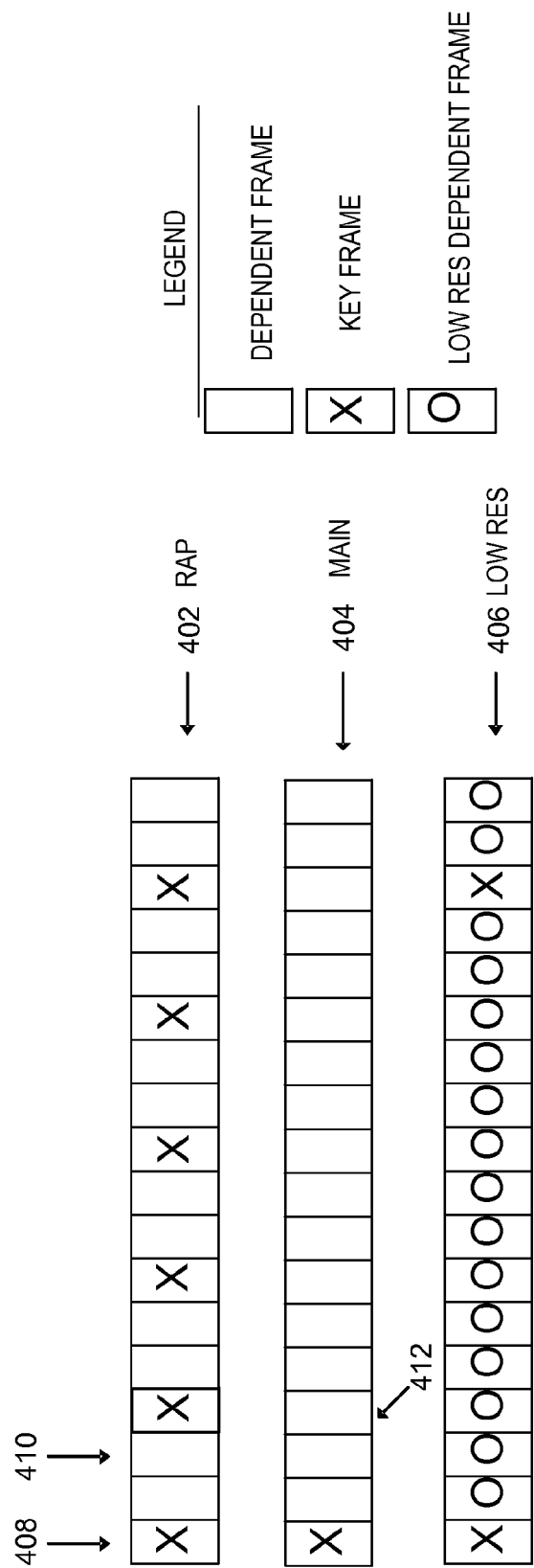
FIG. 4 is a block diagram illustrating an example of the three types data streams dedicated to a particular media channel of multimedia content according to an embodiment of the invention.

In order to accommodate a detected client-condition, the invention introduces three data streams that are dedicated to each media channel. However, more streams can be used in implementing other embodiments. Out of the N streams that may be implemented, three streams are dedicated to a specific purpose of Picture in Picture and low bandwidth, a Random Access Point (RAP) channel, and a main profile (ideal bandwidth) channel. FIG. 4 is a block diagram illustrating an example of the three types of data streams that can be dedicated to a particular channel of multimedia content according to an embodiment of the invention. For example, a particular video channel can have its content continuously transmitted on data streams 402, 404, and 406. Data stream transmitter 204 (FIG. 2) is a computer hardware or software component that is configured to transmit packets from one of the three streams to a client based on the client-condition detected by CCDC 202.

Data stream 402 is a RAP data stream that generally transmits more key frames than the other data streams 404 and 406. In an embodiment, data stream transmitter 204 will transmit packets from data stream 402 to a client device when the CCDC 202 detects that a user has just joined a new media channel (from another media channel or when client joins first a media channel coming onto a network). The RAP data stream 402 will typically be bigger in terms of bandwidth than the other two data streams since it has more key frames. Since the frequency of key frames transmitted in the RAP data stream 402 is higher than the other two data streams, transmitting packets from the RAP data stream 402 is beneficial to users first joining a media channel because they have a greater chance of getting a full, complete picture from the key frames. If a user were to receive packets from data stream 404 where there a lesser number of key frames, there would be a greater chance that the user would be presented with more dependent frames that would typically not give the user a full, complete picture. In such an example, certain sections of an image may be missing when displayed to a user or the picture may appear coarse or "grainy". Therefore, it may take several seconds for a client device to receive enough dependent frames to reconstruct an item of video or audio content to be provided in an acceptable form to a user. Such a delay is often detrimental to the user's experience.

Data stream 404 is a main data stream that generally transmits more dependent frames than the RAP data stream 402. In an embodiment, data stream transmitter 204 will transmit packets from the main data stream 404 to a client device when CCDC 202 detects that a user has maintained communication with a media channel for a predetermined length of time after joining the media channel. Transmitting data packets from the main data stream 404 can be beneficial to a user because a small or limited bandwidth environment may not be able to efficiently handle the large size of the key frames which are more numerous in the RAP data stream 402. Sending as many dependent frames as possible may be the best way for such an environment to optimally operate. Accordingly, a user joining a media channel may initially be sent packets from the RAP data stream 402, but then may be sent packets from the main data stream 404 once the user has maintained communication with the media channel for a predetermined length of time. For example, referring to FIG. 4, a user joining a particular media channel may initially be sent key frame 408 from RAP data stream 402. After dependent frame 410 is transmitted, the client device may be transitioned to the main data stream 404 and dependent frame 412 can be sent after dependent frame 410.

Data stream 406 is a low resolution data stream that transmits a plurality of low resolution dependent frames. In an embodiment, data stream transmitter 204 will transmit packets from the low resolution data stream 406 to a client device when the CCDC 202 detects that a user has either requested use of a picture-in-picture application, or that the client device is experiencing a low data link within a channel wherein the channel's effective bandwidth is lower that what is required by the channel in order to provide a normal or acceptable presentation experience to a user. In an embodiment, the CCDC 202 can detect the client's performance conditions by the client providing information to the server 200 regarding bandwidth and data rate conditions via RTCP. In an embodiment, the CCDC 202 can detect the client device desires to use a picture-in-picture application by the client sending a Uniform Resource Identifier (URI) of the location for the picture-in-picture content to the server. In such an embodiment, the low resolution dependent frames can be sent for the media channel that will be displayed at the smaller resolution size.

Transmitting data packets from the low resolution data stream 406 can be beneficial to a user when the available bandwidth is low as sending too much data can result in an unfavorable experience for the user. For example, one result could be that the client stops accepting data and the presentation of the media channel pauses as well. Another potential result of sending too much data at times when there is low bandwidth is that a client will lose some of the data and can suffer from pixilation where the media content can appear grainy with a loss in sharpness. Yet another result can be that a decoder within the client that requires the data packets to arrive on-time becomes completely out of its normal state and fails such that the media channel becomes lost.

Figure 5:
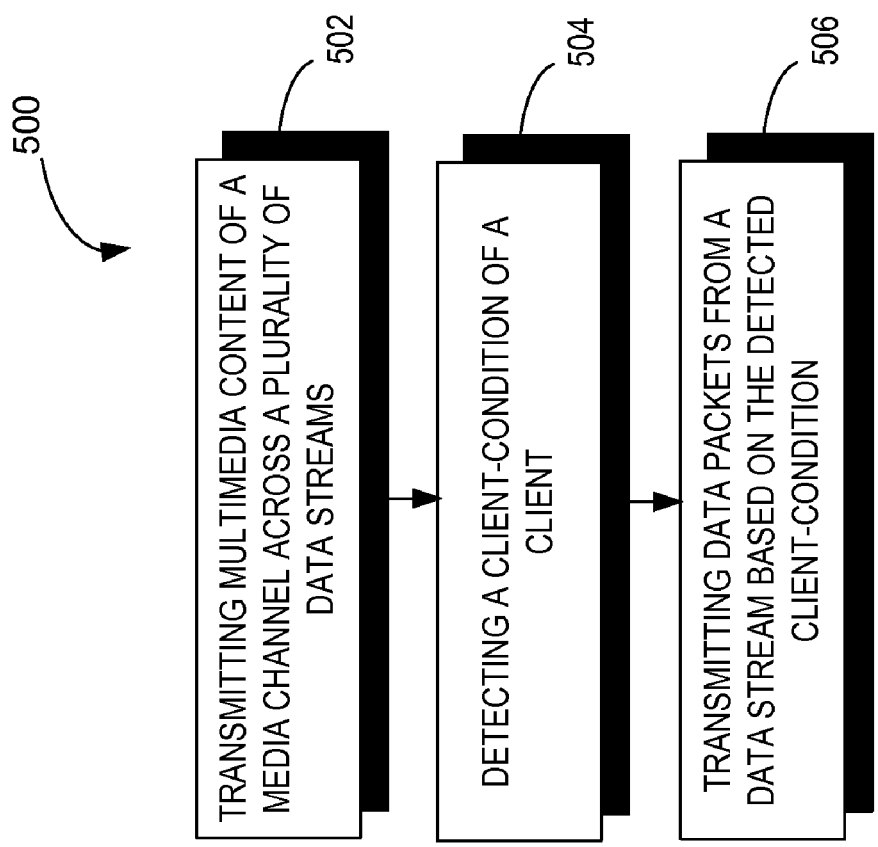
FIG. 5 is a flow diagram of an exemplary method for transitioning between multiple data streams of a media channel according to an embodiment of the invention.

FIG. 5 is a flow diagram of an exemplary method 500 for transitioning between multiple data streams of a media channel according to an embodiment of the invention. At operation 502, multimedia content of a media channel is transmitted across a plurality of data streams. In an embodiment, the plurality of data streams includes a random access point data stream, a main data stream, and a low resolution data stream. At operation 504, a client-condition of a client device is detected. In an embodiment, the client-condition is detected using a CCDC such as CCDC 202. At operation 506, data packets from at least one data stream are transmitted to a client based on the detected client-condition.

FIG. 6 is a flow diagram of another exemplary method 600 for transitioning between multiple data streams of a media channel according to an embodiment of the invention. At operation 602, at least one data packet of a media channel is transmitted to a client from a random access point data stream when the client first joins the media channel. At operation 604, detection is made that the client has maintained communication with the media channel for a predetermined length of time. At operation 606, at least one data packet of the media channel is transmitted to the client from a main data stream after the client has maintained communication with the media channel for the predetermined length of time.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable media having computer-useable instructions embodied thereon, that when executed by one or more computing devices, performs a method for transitioning between multiple data streams of a media channel, the method comprising:
   transmitting multimedia content of a media channel across a plurality of data streams, the plurality of data streams including a random access point data stream, a main data stream, and a low resolution data stream, wherein the random access point data stream transmits more key frames than either the main data stream and the low resolution data stream, wherein the main data stream transmits more dependent frames than the random access point data stream, and wherein the low resolution data stream transmits a plurality of low resolution dependent frames;
   detecting a client-condition of a client device;
   transmitting data packets from at least one data stream to a client based on the detected client-condition;
   detecting another client-condition of the client device;
   transitioning from the at least one data stream to another of the at least one data stream; and
   transmitting data packets from the another of the at least one data stream to the client based on the another client-condition.

2. The media according to claim 1, wherein the client condition comprises at least one of the client running a picture-in-picture application, the client first joining the media channel, the client maintaining communication with the media channel for a predetermined length of time, and the client experiencing a low data link within the media channel wherein an effective amount of bandwidth of the media channel is lower than a required amount of bandwidth.

3. The media according to claim 1, further comprising transmitting at least one data packet of the media channel from the random access point data stream to the client when the client first joins the media channel.

4. The media according to claim 1, further comprising transmitting at least one data packet of the media channel from the main data stream to the client when the client maintains communication with the media channel for a predetermined length of time.

5. The media according to claim 1, further comprising transmitting at least one data packet of the media channel from the low resolution data stream to the client when the client uses a picture-in-picture application.

6. The media according to claim 5, wherein the picture-in-picture application is detected via a Uniform Resource Identifier of a location of picture-in-picture content.

7. The media according to claim 1, further comprising transmitting at least one data packet of the media channel from a high resolution data stream to the client when the client uses a picture-in-picture application.

8. The media according to claim 7, wherein the picture-in-picture application is detected via a Uniform Resource Identifier of a location of picture-in-picture content.

9. The media according to claim 1, further comprising transmitting at least one data packet of the media channel from the low resolution data stream to the client when the client experiences a low data link within the media channel wherein an effective amount of bandwidth of the media channel is lower than a required amount of bandwidth.

10. The media according to claim 9, wherein information related to the low data link is detected via Real-time Transport Protocol.

11. The media according to claim 1, wherein the random access point data stream comprises more key frames than the other data streams.

12. The media according to claim 1, wherein the main data stream comprises more dependent frames than the random access point data stream.

13. The media according to claim 1, wherein the low resolution data stream comprises more low resolution key frames and dependent frames than the other data streams.

14. One or more tangible computer-readable media having computer-useable instructions embodied thereon, that when executed by one or more computing devices, performs a method for transitioning between multiple data streams of a media channel, the method comprising:
   implementing at least three data streams, wherein a first data stream transmits a random access point data stream, the second data stream transmits a main data stream, and a third data stream transmits a low resolution data stream, wherein the random access point data stream transmits more key frames than either the main data stream and the low resolution data stream, and wherein the low resolution data stream transmits a plurality of low resolution dependent frames;
   transmitting at least one data packet of a media channel to a client from the random access point data stream when the client first joins the media channel;
   detecting the client has maintained communication with the media channel for a predetermined length of time;
   transitioning from the random access point data stream to the main data stream; and
   transmitting the at least one data packet of the media channel to the client from the main data stream after the client has maintained communication with the media channel for the predetermined length of time, wherein the main data stream transmits more dependent frames than the random access point data stream.

15. The media according to claim 14, further comprising:
   detecting the client desires to use a picture-in-picture application; and
   transmitting the at least one data packet of the media channel to the client from the low resolution data stream, wherein the media channel is to be displayed at a lower resolution size than another media channel being used in the picture-in-picture application.

16. The media according to claim 14, further comprising:
  detecting the client is experiencing a low data link within the media channel wherein an effective amount of bandwidth of the media channel is lower than a required amount of bandwidth; and
  transmitting at least one data packet of the media channel to the client from a low resolution data stream.

17. A system for transitioning between multiple data streams of a media channel, comprising:
  a client-condition detection component for detecting a condition of a client, a condition comprising at least one of the client running a picture-in-picture application, the client first joining a media channel, the client maintaining communication with the media channel for a predetermined length of time, and the client experiencing a low data link within the media channel wherein an effective amount of bandwidth of the media channel is lower than a required amount of bandwidth; and
  a data stream transmitter for transmitting at least one data packet from a data stream of the media channel based on the detected client condition, wherein the data stream transmitter can transmit a random access point data stream, a main data stream, and a low resolution data stream, wherein the random access point data stream transmits more key frames than either the main data stream and the low resolution data stream, wherein the main data stream transmits more dependent frames than the random access point data stream, and wherein the low resolution data stream transmits a plurality of low resolution dependent frames.

18. The system according to claim 17, wherein the data stream transmitter transmits at least one data packet of the media channel from the random access point data stream to the client when the client first joins the media channel.

19. The system according to claim 17, wherein the data stream transmitter transmits at least one data packet of the media channel from the main channel to the client when the client maintains communication with the media channel for a predetermined length of time.

20. The system according to claim 17, wherein the data stream transmitter transmits at least one data packet of the media channel from the low resolution data stream to the client when the client experiences the low data link within the media channel wherein an effective amount of bandwidth of the media channel is lower than a required amount of bandwidth.

21. The system according to claim 17, wherein the data stream transmitter transmits at least one data packet of the media channel from a high resolution data stream to the client when the client experiences a bandwidth improvement wherein an effective amount of bandwidth of the media channel is higher than a required amount of bandwidth.

* * * * *